United States Patent
Nasr et al.

(10) Patent No.: US 11,718,193 B2
(45) Date of Patent: Aug. 8, 2023

(54) ELECTRIC VEHICLE POWER-HUB AND OPERATING MODES THEREOF

(71) Applicants: THE GOVERNING COUNCIL OF THE UNIVERSITY OF TORONTO, Toronto (CA); HAVELAAR CANADA INDUSTRIAL R&D LABORATORY LTD., North York (CA)

(72) Inventors: Miad Nasr, Toronto (CA); Olivier Trescases, Toronto (CA)

(73) Assignees: THE GOVERNING COUNCIL OF THE UNIVERSITY OF TORONTO, Toronto (CA); ELEAPPOWER LTD., North York (CA)

( * ) Notice: Subject to any disclaimer, the term of this patent is extended or adjusted under 35 U.S.C. 154(b) by 413 days.

(21) Appl. No.: 16/644,374

(22) PCT Filed: Sep. 5, 2018

(86) PCT No.: PCT/CA2018/051071
§ 371 (c)(1),
(2) Date: Mar. 4, 2020

(87) PCT Pub. No.: WO2019/046939
PCT Pub. Date: Mar. 14, 2019

(65) Prior Publication Data
US 2021/0061125 A1    Mar. 4, 2021

Related U.S. Application Data

(60) Provisional application No. 62/554,263, filed on Sep. 5, 2017.

(51) Int. Cl.
*B60L 53/22* (2019.01)
*B60L 55/00* (2019.01)
(Continued)

(52) U.S. Cl.
CPC ............... *B60L 53/22* (2019.02); *B60L 53/16* (2019.02); *B60L 53/53* (2019.02); *B60L 55/00* (2019.02);
(Continued)

(58) Field of Classification Search
CPC .......... B60L 55/00; B60L 53/16; B60L 53/22; B60L 53/53; B60L 2210/40;
(Continued)

(56) References Cited

U.S. PATENT DOCUMENTS 8,441,231 B2 * 5/2013 Menegoli ............ H02M 3/1582
320/128
8,611,107 B2 * 12/2013 Chapman .......... H02M 3/33523
363/21.04

(Continued)

FOREIGN PATENT DOCUMENTS

CN      1599188 A    3/2005
CN    105277893 A    1/2016
(Continued)

OTHER PUBLICATIONS

Qian Zhang, A Controlled-Type ZVS Technique Without Auxiliary Components for the Low Power DC/AC Inverter, 2013, IEEE, 3287-3296 (Year: 2013).*

(Continued)

*Primary Examiner* — Bickey Dhakal
(74) *Attorney, Agent, or Firm* — Ware, Fressola, Maguire & Barber LLP

(57) ABSTRACT

A power-hub for an electric vehicle and operating modes thereof are disclosed herein. The disclosed power-hub is designed to operate in the Vehicle-to Grid (V2G), Grid-to-Vehicle (G2V), Vehicle-to-Home (V2H), and Vehicle-to-Vehicle (V2V) operating modes. When operating in the V2V mode, the power-hub is configured to allow for sending DC (Continued)

power through a conventional AC power port, with all the associated ratings and constraints from the AC design, in order to achieve higher power transfer and efficiency for V2V operation. A digital Hysteretic Current Mode Control (HCMC) scheme is disclosed and the efficiency and loss distribution of four operating modes are disclosed for the power-hub: 1) DC-AC Boundary Conduction Mode (BCM), 2) DC-AC Continuous Conduction Mode (CCM)/BCM hybrid, 3) DC-DC BCM, and 4) DC-DC CCM. A low-frequency commutation scheme is also disclosed that allows for reducing the peak junction temperature.

24 Claims, 12 Drawing Sheets

(51) Int. Cl.
| | | |
|---|---|---|
| B60L 53/53 | (2019.01) | |
| B60L 53/16 | (2019.01) | |
| H02M 1/12 | (2006.01) | |
| H02M 3/335 | (2006.01) | |
| H02M 7/5387 | (2007.01) | |
| H02M 1/00 | (2006.01) | |
| H02M 1/42 | (2007.01) | |

(52) U.S. Cl.
CPC ......... H02M 1/126 (2013.01); H02M 1/4233 (2013.01); H02M 3/33573 (2021.05); H02M 3/33584 (2013.01); H02M 7/53871 (2013.01); B60L 2210/40 (2013.01); H02M 1/0003 (2021.05)

(58) Field of Classification Search
CPC ............ B60L 2210/10; B60L 2210/30; H02M 1/126; H02M 1/4233; H02M 3/33584; H02M 7/53871; H02M 1/0003; H02M 3/335; H02M 3/33569; Y02T 90/14; Y04S 10/126
See application file for complete search history.

(56) References Cited

U.S. PATENT DOCUMENTS

| | | | | |
|---|---|---|---|---|
| 10,454,381 | B2* | 10/2019 | Li | H02J 7/02 |
| 2012/0013190 | A1* | 1/2012 | Chang | H02J 3/44 |
| | | | | 307/80 |
| 2012/0299553 | A1 | 11/2012 | Menegoli et al. | |
| 2013/0057200 | A1* | 3/2013 | Potts | H02M 3/33584 |
| | | | | 320/107 |
| 2013/0307511 | A1 | 11/2013 | De Vries | |
| 2014/0159670 | A1 | 6/2014 | Lee et al. | |
| 2014/0354195 | A1* | 12/2014 | Li | B60L 58/10 |
| | | | | 318/139 |
| 2014/0354240 | A1 | 12/2014 | Wang et al. | |
| 2014/0368170 | A1* | 12/2014 | Tang | B60L 3/0046 |
| | | | | 320/137 |
| 2015/0036404 | A1* | 2/2015 | Rozand | H02M 7/5387 |
| | | | | 363/132 |
| 2015/0372622 | A1* | 12/2015 | Ortiz | H02M 1/15 |
| | | | | 318/376 |
| 2016/0028304 | A1 | 1/2016 | O'Day | |
| 2016/0141972 | A1* | 5/2016 | Yamada | H02M 7/797 |
| | | | | 363/37 |
| 2017/0133936 | A1 | 5/2017 | De Vries | |
| 2017/0163163 | A1 | 6/2017 | Jang et al. | |
| 2018/0123495 | A1* | 5/2018 | Bäurle | H02P 6/14 |
| 2019/0126760 | A1* | 5/2019 | Najmabadi | B60L 53/14 |

FOREIGN PATENT DOCUMENTS

| | | | |
|---|---|---|---|
| CN | 108075657 A | * | 5/2018 |
| JP | H0775329 A | | 3/1995 |
| JP | 2013090458 A | | 5/2013 |
| JP | 2014033501 A | | 2/2014 |
| JP | 2016528862 A | | 9/2016 |
| JP | 2017127072 A | | 7/2017 |
| KR | 20110094634 A | | 8/2011 |
| WO | 2012109680 A2 | | 8/2012 |

OTHER PUBLICATIONS

W. Kramer, et al; "Advanced Power Electronic Interfaces for Distributed Energy Systems Part 1: Systems and Topologies"; Technical Report; Mar. 1, 2008; Section 10.2.
English language Abstract of KR20110094634.
English language Abstract of JPH0775329.
English language Abstract of JP2014033501.
English language Abstract of JP2016528862.
English language Abstract of JP2013090458A.
English language Abstract of JP2017127072A.
English language Abstract of CN105277893A.
English language Abstract of CN1599188A.

* cited by examiner

ELECTRIC VEHICLE POWER-HUB AND OPERATING MODES THEREOF

TECHNICAL FIELD

The present disclosure relates to a power-hub for an electric vehicle, and in particular to control methods and operating modes of the power-hub.

BACKGROUND

Range anxiety and slow charging times remain a significant obstacle to the widespread adoption of electric vehicles (EVs), and particularly plug-in electric vehicles (PEVs). Current owners of EVs face the possibility of being stranded in transit with a completely discharged battery, or alternatively, the EV may become totally discharged if left unattended and unplugged at low State-of-Charge (SOC) in a parking lot. Existing solutions for owners of EVs in such situations generally require towing the vehicle to the nearest charging station.

Accordingly, an additional, alternative, and/or improved power-hub for an electric vehicle remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

SUMMARY

Figure 1:
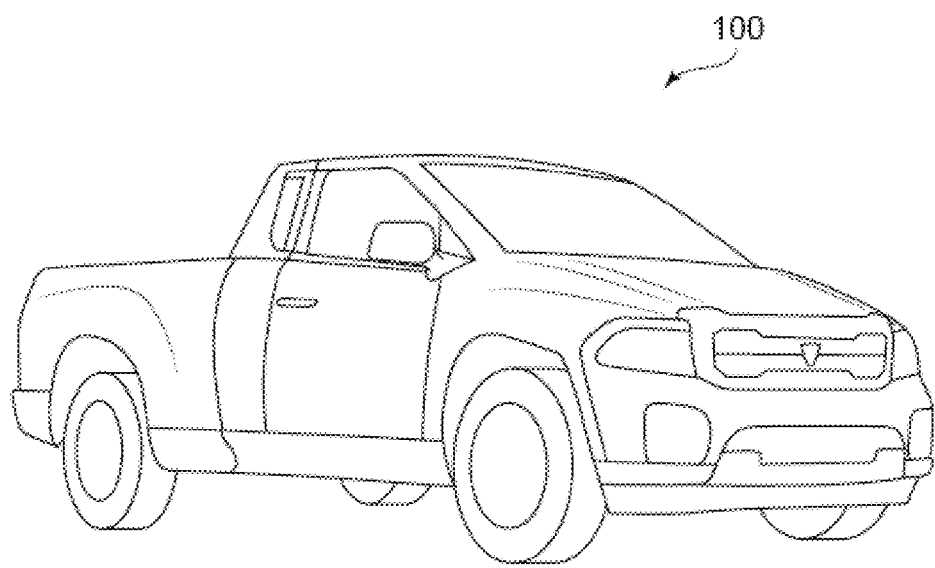
FIG. 1 shows a photograph of an exemplary EV pickup truck that may contain the power-hub disclosed herein.

According to one aspect of the disclosure, a power-hub for an electric vehicle is disclosed, the power-hub coupled with a battery of the electric vehicle, the power-hub comprising a bi-directional converter comprising electrical circuitry coupled with a DC link bus and an AC port of the power-hub, the electrical circuitry comprising: at least four semiconductor switches; an EMI (electromagnetic interference) filter coupled in series with the AC port; and two inductors coupled in series with the EMI filter, wherein a first inductor is coupled with a first pair of the semiconductor switches and a second inductor is coupled with a second pair of the semiconductor switches; and control logic for controlling a current through the inductors and for controlling switching of the semiconductor switches, wherein the control logic is configured to perform Hysteretic Current Mode Control (HCMC) when controlling the current through the inductors.

In accordance with the above aspect, the bi-directional converter may comprise a dual-active-bridge (DAB) converter for regulating current through the battery.

In accordance with the above aspect, the control logic may comprise a field-programmable gate array (FPGA), and wherein the FPGA comprises a first deadtime controller (denoted DT Control in the figures) for controlling the first pair of the semiconductor switches and a second deadtime controller (also denoted DT Control in the figures) for controlling the second pair of the semiconductor switches.

In accordance with the above aspect, the semiconductor switches may comprise any one of: metal-oxide-semiconductor field-effect transistors (MOSFETs), insulated-gate bipolar transistors (IGBTs), and GaN high-electron mobility transistors (HEMTs).

In accordance with the above aspect, the power-hub may be configured to receive and transmit AC power through the AC port, and the control logic is configured to operate the electrical circuitry by switching between a boundary condition mode (BCM) and a hybrid BCM-continuous conduction mode (CCM).

In accordance with the above aspect, the power-hub may provide electric power to a home in a vehicle-to-home (V2H) operating mode.

In accordance with the above aspect, the controller may be further configured to apply a synchronization pulse to the electrical circuitry that synchronizes with a voltage frequency and phase of a grid.

In accordance with the above aspect, the power-hub may provide electric power to the grid in a vehicle-to-grid (V2G) operating mode.

In accordance with the above aspect, the power-hub may receive electric power from the grid in a grid-to-vehicle (G2V) operating mode.

In accordance with the above aspect, the power-hub may be configured to receive and transmit DC power through the AC port, and the control logic is configured to operate the electrical circuitry by switching between a boundary condition mode (BCM) and a continuous conduction mode (CCM).

In accordance with the above aspect, the DC voltage may be received and transmitted at the peak voltage of the AC line cycle.

In accordance with the above aspect, the power-hub may be configured to operate at 240 $V_{RMS}$, and wherein the DC voltage is received and transmitted at a voltage of 340 V.

According to a further aspect of disclosure, a system for charging a depleted battery in an electric vehicle is disclosed, the system comprising: a first electric vehicle comprising a charged electric battery and a first power-hub in accordance with the above aspects wherein the power-hub is configured to receive and transmit DC power through the AC port; and a second electric vehicle comprising the depleted battery and a second power-hub in accordance with the above aspects wherein the power-hub is configured to receive and transmit DC power through the AC port; wherein a direct link is established between the first power-hub and the second power-hub; and wherein the control logic of the first power-hub is configured to operate in a vehicle-to-vehicle (V2V) operating mode and transmit DC power through the direct link to the second power-hub.

In the system according to the above aspect, the control logic of the first power-hub may be further configured to commutate the polarity of the DC voltage provided to the second power-hub in pre-defined commutation intervals.

In the system according to the above aspect, the polarity of the DC voltage provided to the second power-hub may be commutated at a frequency of less than 50 Hz, e.g. at a frequency of 1 Hz.

A power-hub for an electric vehicle and operating modes thereof are disclosed herein. An exemplary description is given of a high-density, bi-directional, 5 kW EV power-hub that is designed to operate in the Vehicle-to Grid (V2G), Grid-to-Vehicle (G2V), Vehicle-to-Home (V2H), and Vehicle-to-Vehicle (V2V) operating modes.

The power-hub disclosed herein may be configured to allow for transmitting DC power through a conventional 240 $V_{RMS}$ Level-2 AC power port, with all the associated ratings and constraints from the AC design, in order to achieve higher power transfer and efficiency for V2V operation. Using a digital Hysteretic Current Mode Control (HCMC) scheme, the efficiency and loss distribution of four operating modes are disclosed for the power-hub: 1) DC-AC Boundary Conduction Mode (BCM), 2) DC-AC Continuous Conduction Mode (CCM)/BCM hybrid, 3) DC-DC BCM, and 4) DC-DC CCM. The peak efficiency of the power-hub may be increased from 96.6% to 98.3% by operating in DC transfer mode for V2V operation, thus allowing for an increase in the power capability by 50%. A low-frequency commutation scheme is also disclosed that allows for reducing the peak junction temperature.

Another inventive aspect is a power-hub comprising an AC port connectable to either an AC micro-grid or a DC micro-grid, four semiconductor switches, an EMI filter coupled in series with the AC port and two inductors coupled in series with the EMI filter. A first inductor is coupled with a first pair of the semiconductor switches and a second inductor is coupled with a second pair of the semiconductor switches. The power-hub also includes control logic configured to transmit DC power through the AC port.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

DETAILED DESCRIPTION

Embodiments of the invention are described below, by way of example only, with reference to FIGS. 1-11.

FIG. 1 shows a photograph of an exemplary EV pickup truck 100 that may contain the power-hub disclosed herein. The EV pickup truck 100 may operate solely using electric power, and may for example contain a 450V Li-ion battery pack. Although a pickup truck is illustrated, it will be appreciated that the power-hub may be used in any other type of electric vehicle.

Figure 2:
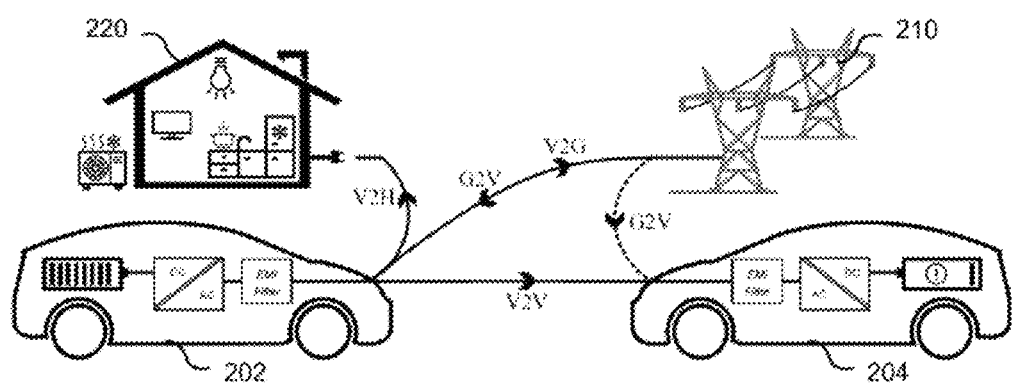
FIG. 2 shows a schematic representation of different operating modes of which the power-hub disclosed herein is configured to operate.

FIG. 2 shows a schematic representation of different operating modes of which the power-hub disclosed herein is configured to operate. As will be further described herein, the power-hub may be operated in the Vehicle-to Grid (V2G), Grid-to-Vehicle (G2V), Vehicle-to-Home (V2H), and Vehicle-to-Vehicle (V2V) operating modes. As depicted in FIG. 2, in the V2G operating mode, electricity from a charged vehicle 202 may be sent to the electricity grid 210. The charged vehicle 202 may correspond to a vehicle that has a battery with a given level of charge, but does not necessarily have to be fully charged. In the G2V operating mode, electricity from the electricity grid 210 may be provided to either the charged vehicle 202 or a discharged vehicle 204. In the V2H operating mode, electricity from the charged vehicle may be provided to the house/home 220. In the V2V operating mode, electricity from the charged vehicle 202 may be provided to the discharged vehicle 204.

The power-hub operates in a similar configuration for the different operating modes, but may be optimized for respective modes, as will be described with reference to FIGS. 3 through 5, for example.

Figure 3:
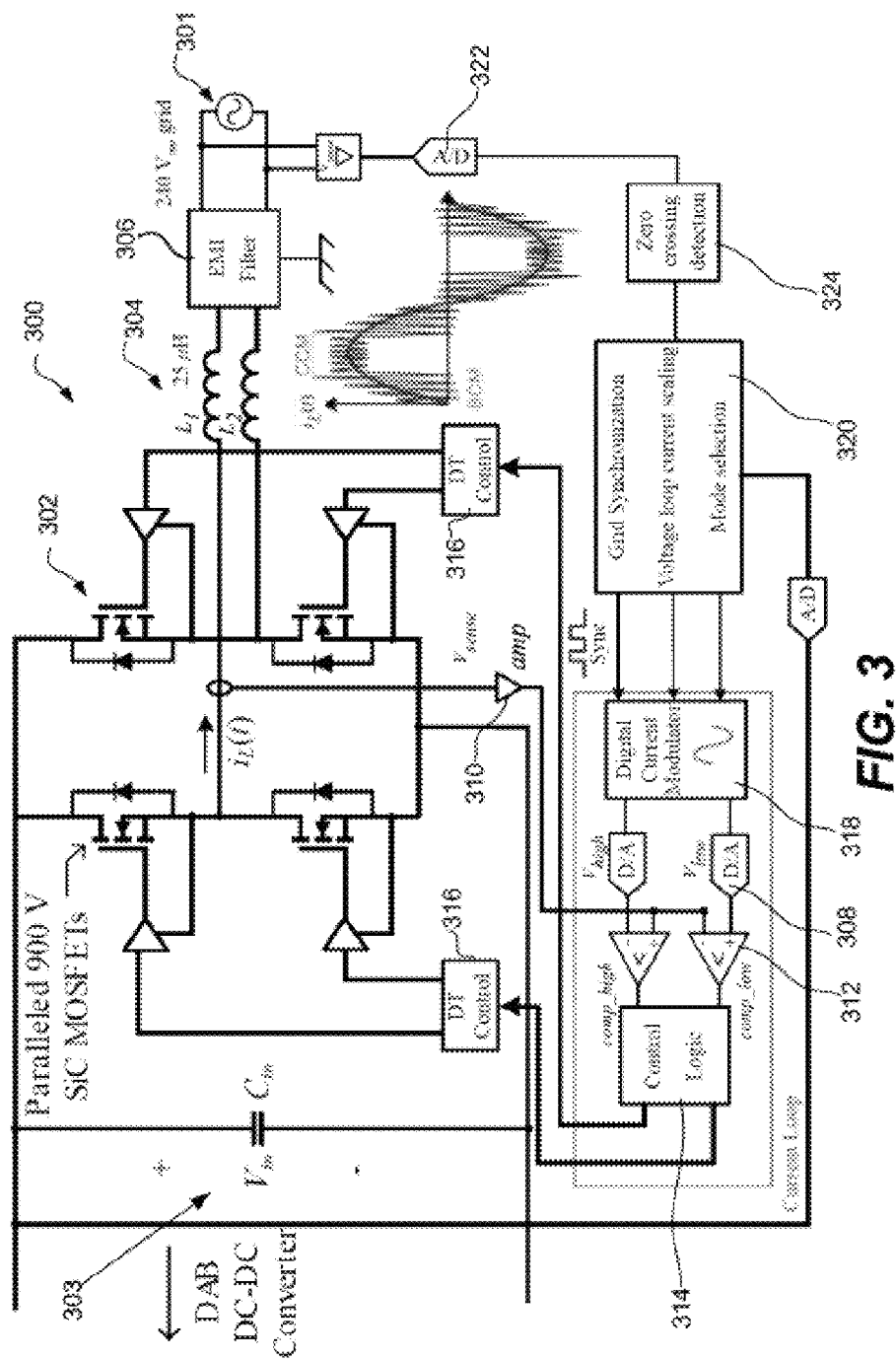
FIG. 3 shows an exemplary embodiment of system architecture of the power-hub.

FIG. 3 shows an exemplary embodiment of system architecture of a power-hub 300. The power-hub shown in FIG. 3 is implemented as a two-stage bi-directional converter, with a Dual-Active-Bridge (DAB) converter regulating the battery current and a Full-Bridge DC-AC converter performing Power Factor Correction (PFC) and regulating the DC link bus voltage, $V_{in}$. In alternative embodiments, instead of performing DC-AC conversion, the power-hub may be configured to output and/or receive DC power, thus performing DC-DC conversion in the second stage as described with reference to FIG. 5.

In the embodiment depicted in FIG. 3, the electrical circuit of the converter comprises four switches 302 and a respective first and second inductor 304, coupled between an EMI filter 306 at an output and a respective pair of the switches. The inductance of the two inductors is exemplarily shown as 25 µH, but is not limited to such. All the switches in the converter are exemplarily shown as being implemented using paralleled 900V SiC MOSFETs, but the scope of this disclosure is not limited to such. For example, the switches may be implemented with various semiconductor switches such as insulated-gate bipolar transistors (IGBTs) or GaN high-electron mobility transistors (HEMTs). It may be preferable to use wide-bandgap devices such as SiC or GaN to reduce the size of the power-hub by operating at high-frequencies. A person skilled in the art will readily appreciate how the components of the power-hub could be varied to modify the operation of the power hub under different conditions without departing from the scope of this disclosure.

The power-hub shown by way of example in FIG. 3 provides a DC-AC power stage between an AC port 301 and a DC port 303 or DC link bus. In the embodiment depicted in FIG. 3, the EMI filter 306 is coupled in series between the AC port 301 and the inductors 304. Unlike conventional sinusoidal Pulse-Width-Modulation (PWM), the DC-AC power stage operates in Hysteretic Current Mode Control (HCMC). The peaks and valleys of the inductor current, $i_L(t)$, are digitally controlled on a cycle-by-cycle basis using a set of 12-bit Digital-to-Analog Converters (DACs) 308, a high bandwidth current sense amplifier 310 and two comparators 312. Particularly, the HCMC control may be achieved by sensing the inductor current through the sense resistor, comparing the sensed inductor current with two signals, $V_{high}$ and $V_{low}$, and then generating the necessary gating signals using control logic 314. The control logic is essentially a set-reset flip-flop with some protection logic. A turn-on delay (deadtime controller 316, which receives the signals from the control logic 314) is used to prevent shorting of the DC input voltage (shoot through). The control logic for performing the HCMC may comprise a field-programmable gate array (FPGA). The $V_{high}$ and $V_{low}$ signals are generated by the main FPGA using two Digital-to-Analog Converters (DAC). Modulating $V_{high}$ and $V_{low}$ appropriately at 60 Hz for example will result in a sinusoidal average inductor current that is used for the DC-AC conversion. In the embodiment of FIG. 3, a digital current modulator 318 is used to digitally modulate the current supplied to the DACs 308. In the embodiment of FIG. 3, the power-hub 300 also includes an analog-to-digital converter (ADC) 322 and a zero crossing detector 324 that are electrically connected between the AC port 301 and a digital controller 320. The digital controller 320 is configured to perform current scaling, mode selection and grid synchronization as will be explained below.

Figure 4:
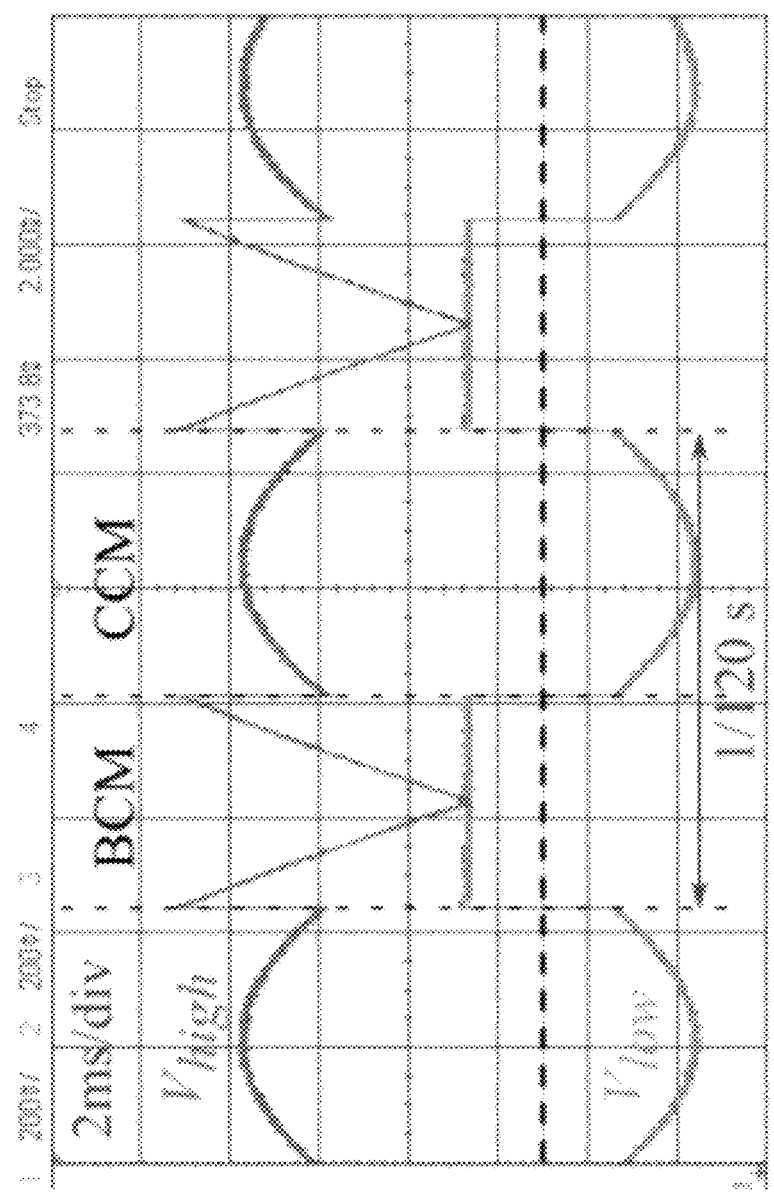
FIG. 4 shows digital reference current modulation for performing hysteretic current mode control.

FIG. 4 shows digital reference current modulation for performing HCMC. In the HCMC scheme conversion, the digital controller 320 (shown in FIG. 3) is used for precise current-control and an appropriate synchronization pulse (i.e. 60 Hz) is used for grid phase locking in G2V and V2G operating modes. The digital current reference is scaled by the digital controller 320 as part of the outer voltage loop. The digital controller 320 also performs mode selection in this embodiment. The inverter operates in two possible modes throughout the AC line-cycle: Boundary Conduction Mode (BCM) or Continuous Conduction Mode (CCM), as shown in FIG. 4. When operating in BCM, a slightly negative valley current, $I_{valley}$, is imposed to achieve zero-voltage turn-on of the MOSFETs through the resonance of the switching node capacitance and main inductor. BCM results in the lowest switching losses, at the expense of higher peak current, higher RMS conduction losses and higher core losses in the inductors.

At the highest current levels, the inverter automatically switches into CCM to minimize the core losses and limit the saturation current requirement of the inductors. The automatic switching of the inverter from BCM is described as follows. With an increase in output load, the inverter keeps operating in BCM until the inductor current hits the saturation current of the inductors, which may be predetermined experimentally. The point of the inductor current reaching the saturation current is determined in the FPGA by continuously comparing the scaled sinusoidal reference current with a digital number representing the saturation current of the inductors. When the sinusoidal reference is higher than the saturation current, $V_{high}$ and $V_{low}$ signals are derived from a different equation (i.e., the CCM equation).

An advantage of the dual-mode hybrid scheme is that the power density of the converter can be significantly increased as inductors with lower saturation currents can be used. The inverter has a variable switching frequency based on HCMC operation, which helps to reduce the EMI filter size due to the spread-spectrum effect. While the SiC based inverter can easily operate above 500 kHz, the frequency is limited to 250 kHz for optimal efficiency.

As previously described, the digital controller 320 is used for precise current-control and a 60 Hz synchronization pulse may be used for grid phase locking (grid synchronization) in G2V and V2G operating modes. In the V2H mode, the power-hub is off-grid and hence there is no need to synchronize to the grid voltage frequency and phase. Automatic switching between modes may be done by the digital controller 320 in the illustrated embodiment.

Figure 5:
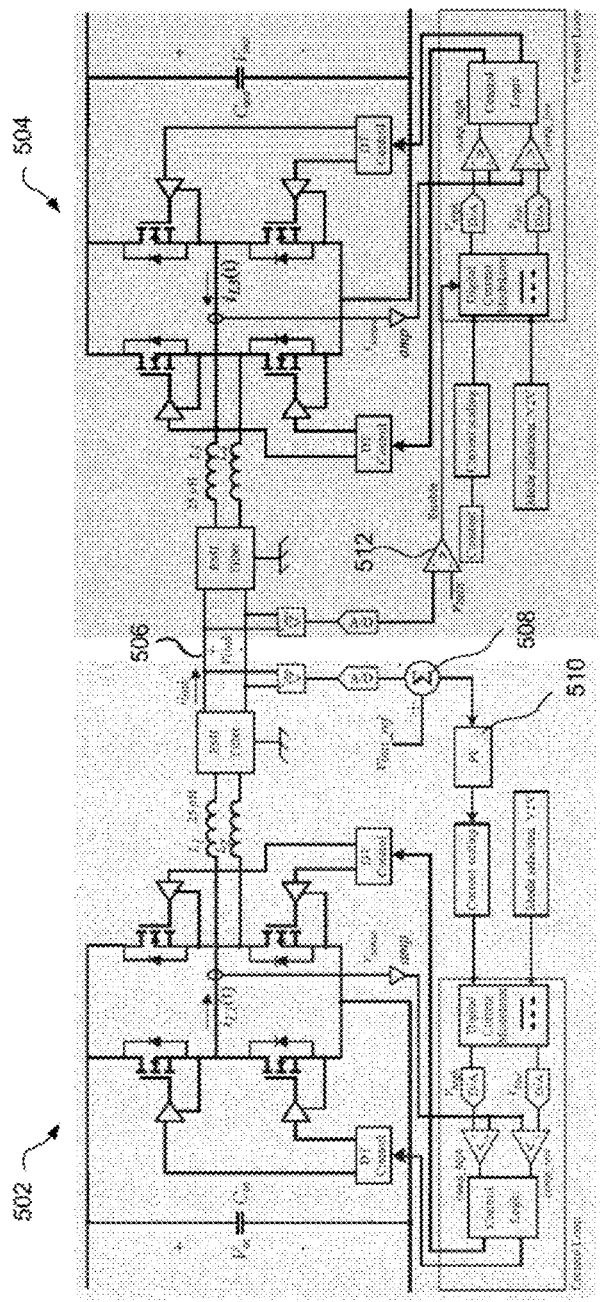
FIG. 5 shows two power-hubs that are transferring DC power and operating in a vehicle-to-vehicle operating mode.

FIG. 5 shows two power-hubs that are operating in the V2V operating mode to transfer DC power. The two power-hubs connected together can either interchange AC power (as described for example with reference to FIG. 3) or DC power. However, the AC power transfer solution faces many challenges as it is not possible to maintain a low total harmonic distortion (THD) sine wave under no-load conditions because of the HCMC controller requirements. Since the receiving EV power-hub needs to first detect an AC voltage with which to synchronize, a no-load condition is inevitable at start up.

The DC power transfer solution is more attractive, as the converter continuously operates at the peak voltage of the AC line cycle (340 V for 240 $V_{RMS}$ AC systems) with a lower current to achieve the same output power, resulting in lower conduction losses and switching frequency and a higher efficiency. DC power transfer also allows the converter to operate beyond its intended AC power rating, which results in a shorter charging time and a faster revival of the depleted battery.

In the V2V mode using DC power transfer, the "AC" ports of the charged power-hub 502 and the charging power-hub 504 are connected through a direct link 506, and the controller is modified to allow DC-DC conversion. In this mode DC power is transferred by generating constant $V_{high}$ and $V_{low}$ signals, as opposed to modulating them at 60 Hz, to ensure that the peak and valley current through inductors L1 and L2 are constant over time. The output voltage of the transmitting power-hub, $V_{link}$, must be regulated to a voltage that is equal to the peak of the AC line cycle (340$V_{DC}$ for 240$V_{RMS}$ AC voltage). This max voltage limit exists because of the over-voltage protection circuitry that exists at the output of all conventional grid-tied DC-AC inverters.

The link voltage, $V_{link}$, is regulated by the charged power-hub 502 to a set reference, $V_{bus\_ref}$, as part of an outer voltage loop. The regulation of $V_{link}$ is performed by first measuring this voltage using an Analog-to-Digital Converter (ADC) and comparing it, using a voltage adder/subtractor 508, to a reference ($V_{bus\_ref}$) which gives an error signal. This error signal is then passed through a compensator (PI controller 510 in this embodiment) and the resultant control signal is used to scale the $V_{high}$ and $V_{low}$ signals. In BCM $V_{low}$ is kept constant (at a value that ensures slight negative valley inductor current) while $V_{high}$ is scaled up and down, and in CCM $V_{high}$ is kept at the maximum possible inductor current while $V_{low}$ is scaled up and down.

Each EMI filter, which is optimized for the AC charging operation, exemplarily includes 10 μF of capacitance that is necessary for the HCMC controller operation and eliminates the need for an external DC link capacitor. As soon as charging power-hub 504 detects a voltage at the DC link, the battery charging process begins with a flipped current direction through L3 by reversing the MOSFET switching sequence. As shown by way of example in FIG. 5, a voltage comparator 512 may be used to compare the voltage $V_{link}$ with a minimum voltage $V_{min}$ and, if the voltage Vlink exceeds the minimum voltage $V_{min}$, the charging process is enabled. The auxiliary supply voltages for each power-hub may be derived from a secondary LV battery and a self-regulating universal DC-AC adapter connected to the output port of the converter. These two independent voltage sources are diode-ORed to prevent any black-out condition especially for the charging power-hub 504, which might also have a depleted LV auxiliary battery. At lower power levels, the controller may be configured to impose a slight negative valley current to ensure soft turn-on of the MOSFETs. To reach higher power levels, the valley current is increased by the HCMC controller resulting in the loss of soft switching, higher switching frequency, but lower RMS current in the inductors.

During DC power transfer, the power-hub can either operate in BCM or CCM, depending on the target power level as previously described. This is similar to the AC power transfer, where the power-hub is operable in BCM or hybrid BCM/CCM. The operation modes of the inverter are restricted based on whether they are providing AC or DC power transfer because, for example, in AC power transfer the power-hub must generate a sinusoidally varying output current as opposed to a constant current in DC mode. Lower average output currents can easily be generated in BCM whereas higher output currents are only possible in CCM. Therefore, if the output current of the power-hub must vary from minimum to maximum rated current at 60 Hz, then the power-hub is operated in BCM to generate the lower portions of the sine wave and switch into CCM to generate the higher portions of the sinewave. This is what is referred to herein as "hybrid BCM/CCM". In the DC power transfer, however, since the output current is not varied it is only possible to operate in either BCM or CCM depending on the output load.

Figure 6:
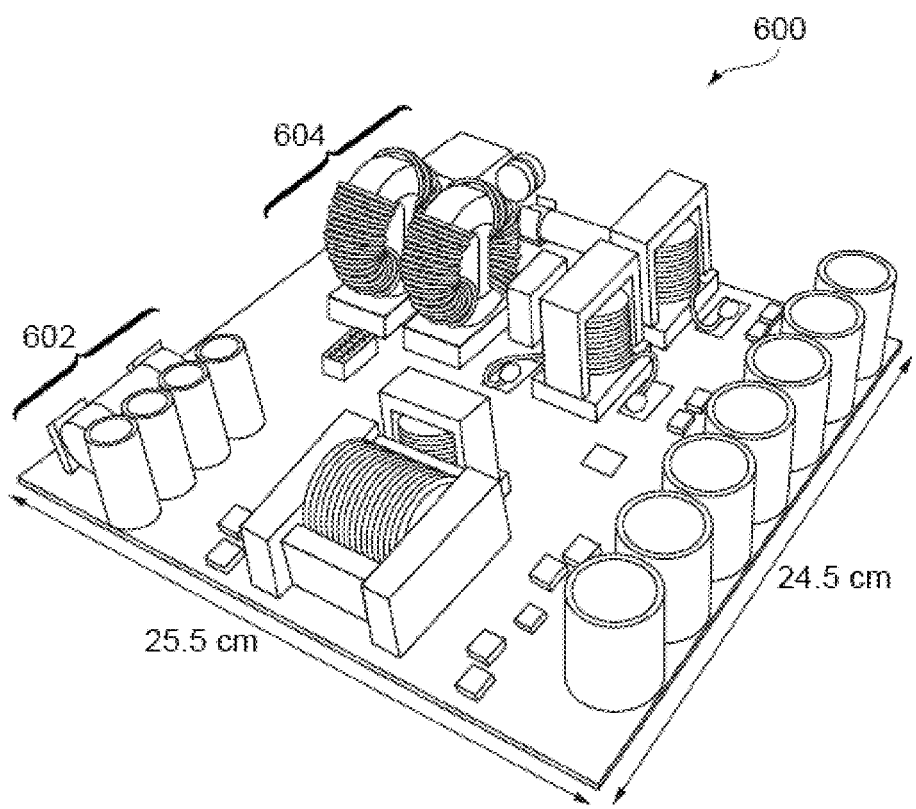
FIG. 6 shows an exemplary power-hub configuration.

FIG. 6 shows an exemplary power-hub configuration 600. The power-hub comprises a DAB converter 602 and an inverter 604. The exemplary power-hub is realized with paralleled 900V, 35 A, 65 mΩ Ron SiC MOSFETs and may include a thermal system design that comprises a customized liquid cooling chill plate for the MOSFETs and air cooling for the power inductors. Liquid cooling cannot be used for the inductors as high switching frequency operation of the converter creates eddy current losses within conductive heat-sinks.

Figure 7A:
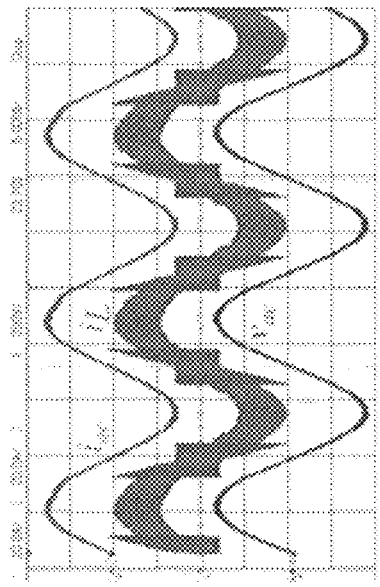
FIGS. 7A-7D show DC-DC and DC-AC operation of the power-hub under different operating conditions.
Figure 7B:
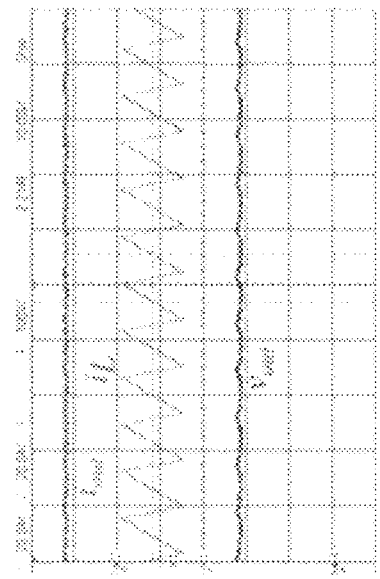
Figure 7C:
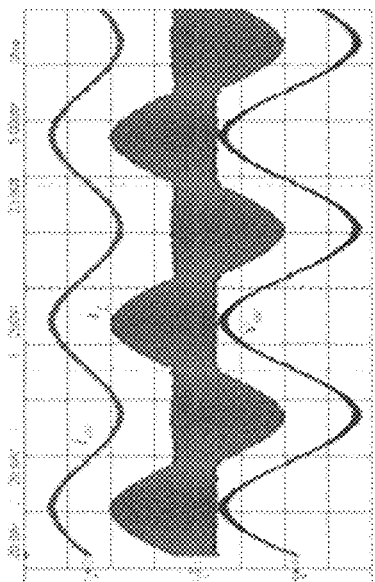
Figure 7D:
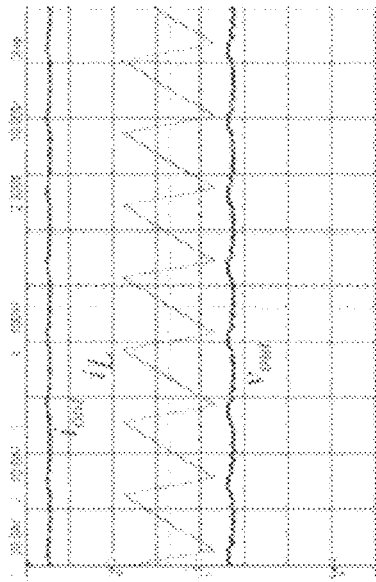

FIGS. 7A-7D show DC-DC and DC-AC operation of the power-hub under different operating conditions. In particular, FIG. 7A shows operation of the power-hub at DC-AC BCM at 2.3 kW, FIG. 7B shows operation of the power-hub at DC-AC BCM/CCM hybrid at 5 kW, FIG. 7C shows operation of the power-hub at DC-DC BCM at 3.4 kW, and FIG. 7D shows operation of the power-hub at DC-DC CCM at 5.3 kW. All waveforms are taken with 450 $V_{DC}$ input and an output of 240 $V_{RMS}$ and 240 $V_{DC}$ in the DC-AC and DC-DC cases, respectively.

Figure 8:
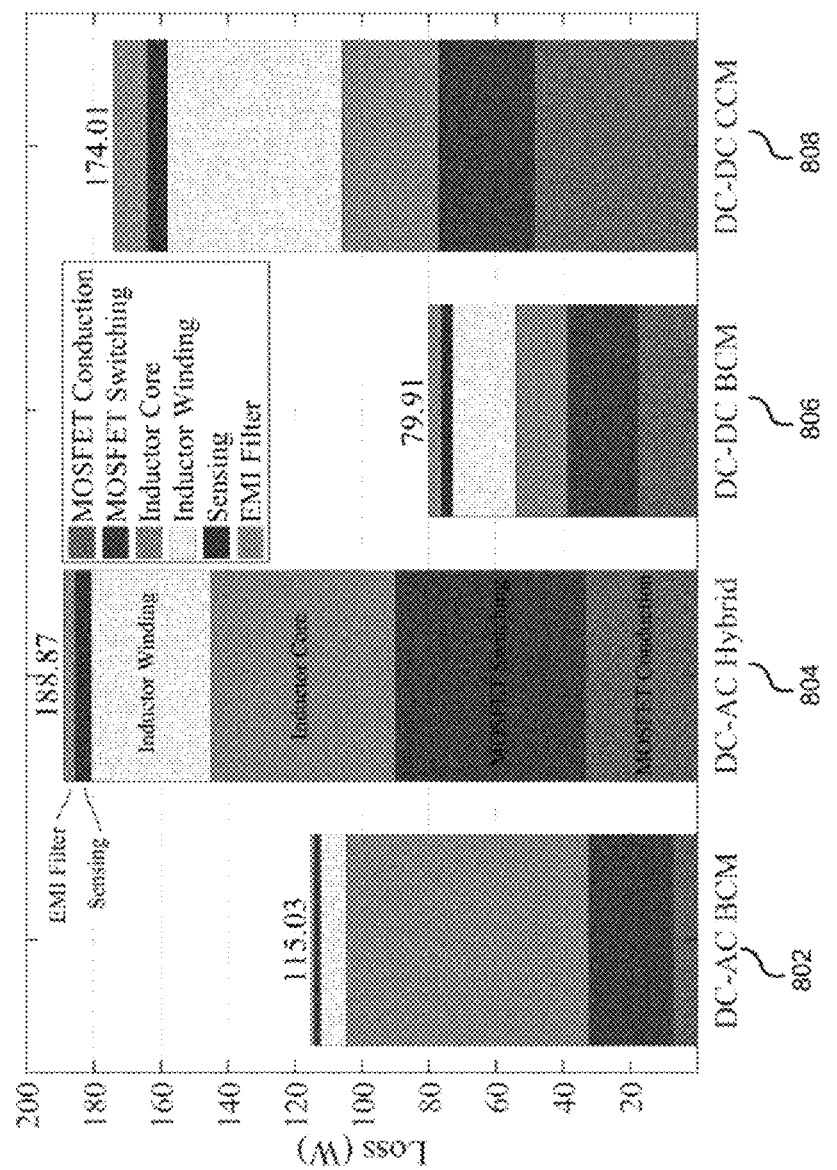
FIG. 8 shows a simulated loss breakdown of the power-hub in the operating modes shown in FIGS. 7A-7D.

FIG. 8 shows a simulated loss breakdown of the power-hub in the operating modes shown in FIGS. 7A-7D. That is, the losses shown by the bar 802 were simulated based on operation of the power-hub at DC-AC BCM at 2.3 kW, the losses shown by the bar 804 were simulated based on operation of the power-hub at DC-AC BCM/CCM hybrid at 5 kW, the losses shown by the bar 806 were simulated based on operation of the power-hub at DC-DC BCM at 3.4 kW, and the losses shown by the bar 806 were simulated based on operation of the power-hub at DC-DC CCM at 5.3 kW.

The loss distribution of the power-hub in each of the four modes was simulated using detailed mixed-mode Cadence simulations with the C3M0065090J MOSFET spice model and an exact implementation of the digital controller. The simulation includes HDL models for the controller and Verilog-a models for data converters. In the DC-AC BCM case, inductor core losses and MOSFET switching losses are the most and least significant source of loss, respectively. This is because of the large inductor current ripple and zero voltage switching (ZVS) turn-on of the MOSFETs. In the DC-AC BCM/CCM hybrid mode, switching losses are significantly increased due to the loss of soft-switching at the line cycle peaks. The inductor core losses are, however, decreased due to lower current ripple. The DC-DC BCM mode of operation is least dissipative due to soft-switching and having the lowest switching frequency. In the DC-DC CCM case the losses are still lower than the DC-AC hybrid mode even though the power level is 2 kW higher.

Figure 9:
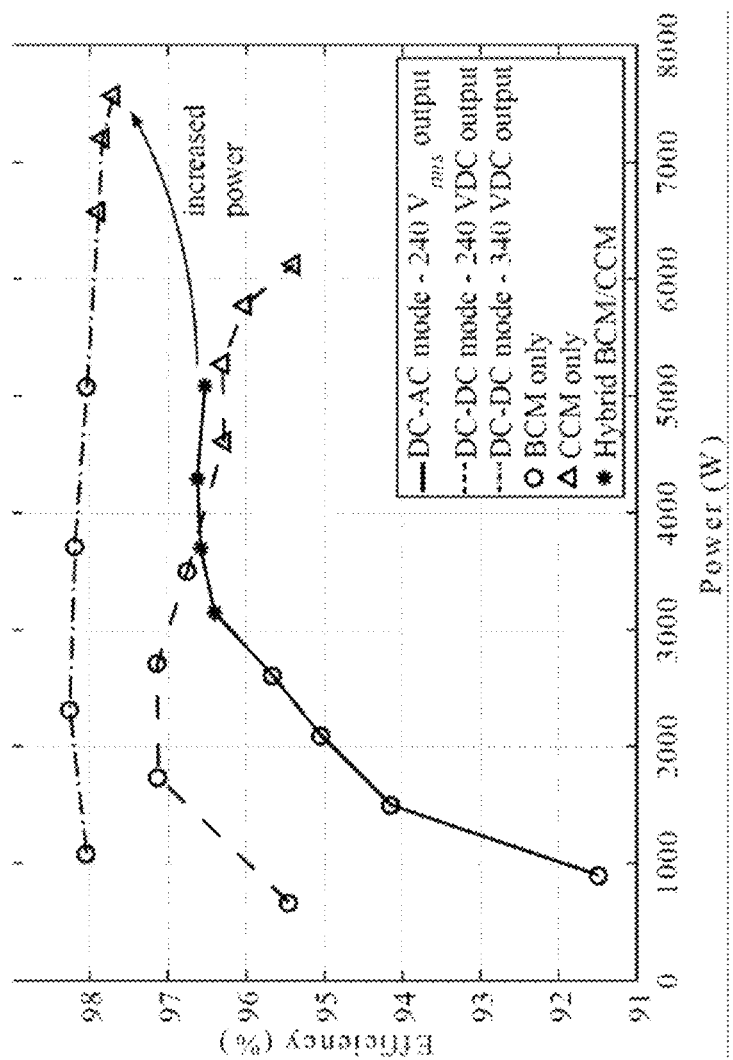
FIG. 9 shows measured efficiency curves of the converter operating in DC-AC and DC-DC mode.

FIG. 9 shows measured efficiency curves of the converter operating in DC-AC and DC-DC modes. As previously described with reference to FIG. 5, as opposed to the DC-AC mode, a constant DC output voltage in the DC-DC operating mode results in higher achievable power-levels. For the same average inductor current, the power level increases proportionally to the output DC voltage. In the BCM only mode, there is an increase in efficiency going from DC-AC to DC-DC operation and with higher output DC voltages due to lower switching frequencies and lower conduction losses. Accordingly, it is most desirable to operate the converter in DC-DC mode at the highest possible output voltage when operating the power-hub in V2V operation. In the V2G, G2V, or V2H schemes, the DC-DC mode is not operable and thus the converter must be operated in the DC-AC mode.

In the present embodiment, the power-hub is optimized for AC power transfer and therefore, the output over-voltage protection circuitry limits $V_{link}$ to 340 V. The CCM mode introduces hard switching and an increased switching frequency, but this allows the converter to operate at 1.5× its rated AC power capability for the same thermal design due to a DC $V_{link}$ and higher efficiency than the DC-AC mode.

Figure 10:
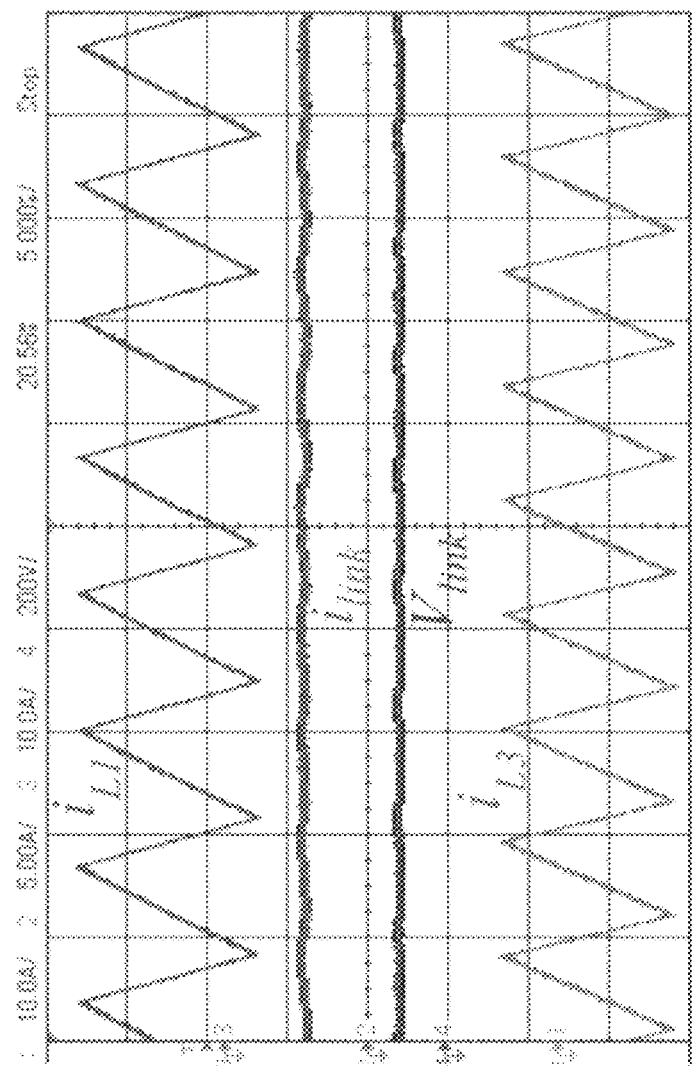
FIG. 10 shows waveforms demonstrating the operation of the two power-hubs in the V2V mode of operation.

FIG. 10 shows waveforms demonstrating the operation of the two power-hubs in the V2V mode of operation. The waveforms depicted in FIG. 10 correspond to 180 $V_{link}$ voltage and 1 kW processing power. Due to the high duty-cycle operation in the DC-DC mode, there is an uneven distribution of losses among the MOSFETs. A potential solution, as shown in FIG. 11, is to commutate the polarity of $V_{link}$ at a very low frequency. This prevents each MOSFET from reaching steady-state thermal equilibrium, leading to a lower peak junction temperature.

Figure 11A:
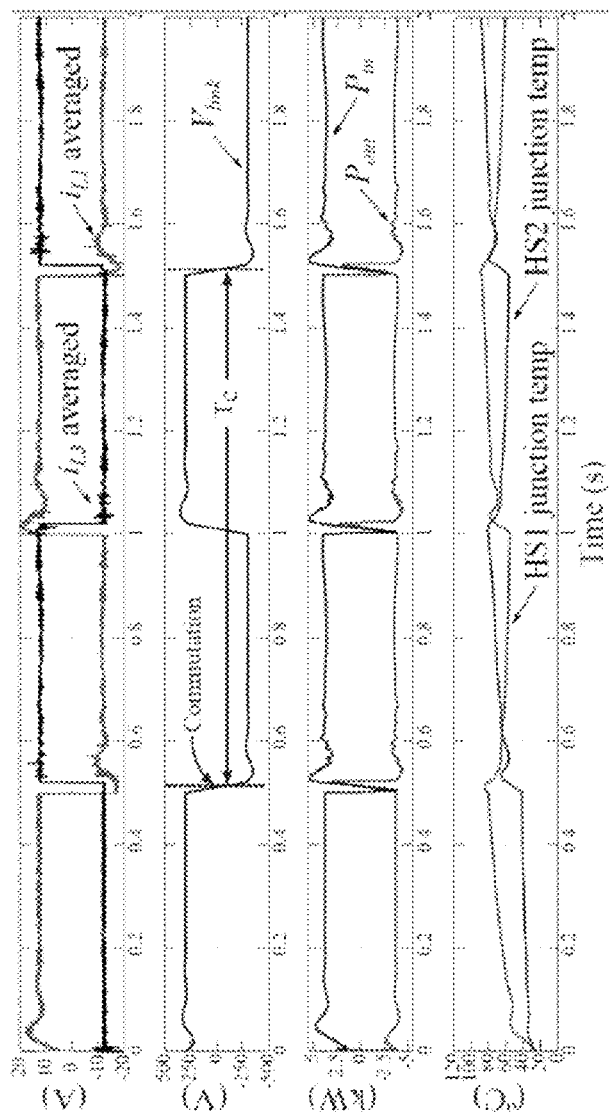
FIGS. 11A and 11B show simulated operation of the two power-hubs in V2V mode.
Figure 11B:
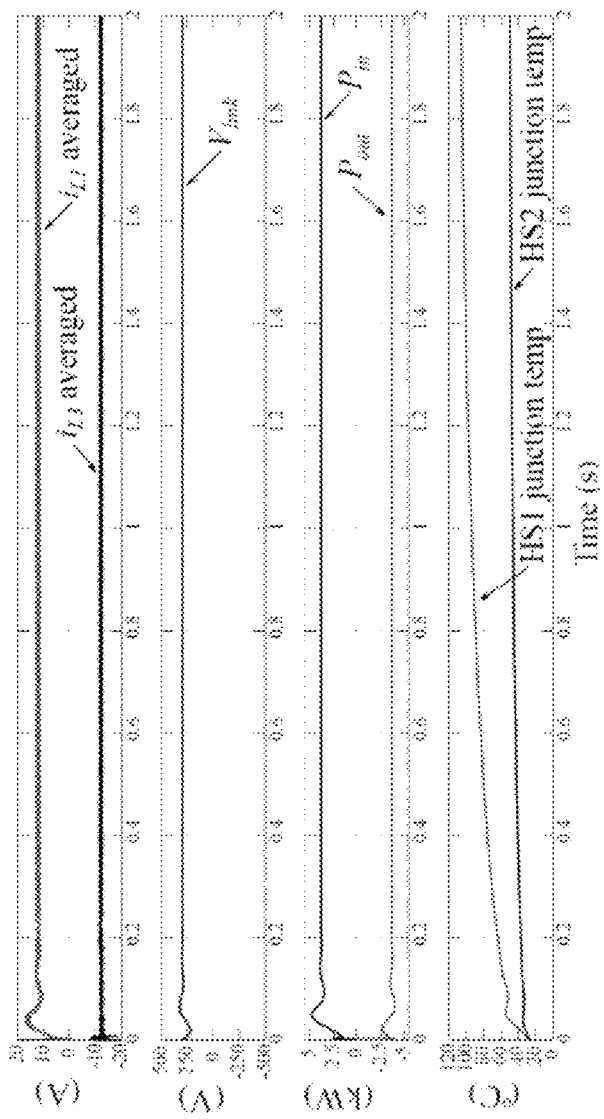

FIG. 11 shows simulated operation of the two power-hubs in V2V mode. FIG. 11A is simulated with constant DC, and FIG. 11B is simulated with bipolar $V_{link}$ regulation. Commutating $V_{link}$ at 1 Hz results in 16° C. lower average and 17° C. lower peak MOSFET junction temperature.

The commutation frequency, $f_c=1/T_c$, can be optimized to achieve the best thermal performance without a significant reduction in average DC power transfer due to the short $V_{link}$ commutation intervals. It must be noted that there is a flip in the power flow direction during the $V_{link}$ commutation interval resulting in a slightly lower average power level, as shown in FIG. 11B. Therefore it is desirable to maintain the shortest possible commutation time for the maximum power transfer. The capacitance within the two EMI filters is the main limiting factor in reducing the commutation time. It is also preferred to have a safe limit on the di/dt and dv/dt of the link node to suppress unwanted EMI.

One or more of the embodiments of the invention may be applied to other non-vehicular systems. In other words, vehicle-to-vehicle operation is only one specific example of how the novel power-hub can be used. In general, the conventional AC port of the power-hub can be connected to either an AC micro-grid or it can be connected to a DC micro-grid. The power-hub is thus a universal power converter that is principally intended for in-vehicle use, but can be extended to link an electrical storage element to another storage element or a DC/AC micro-grid. The power-hub can be connected to an AC utility grid or to an AC micro-grid that is maintained by the power-hub or supplied by other AC sources such as renewable wind energy. The power-hub can alternatively be connected to a DC micro-grid that is maintained by the power-hub or supplied by another power-hub, a DC energy storage element, or DC renewable energy resources such photovoltaic cells. The low frequency commutation scheme is not restricted to V2V and can be used for other DC micro-grid applications.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

It would be appreciated by one of ordinary skill in the art that the system and components shown in FIGS. 1-11 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A power-hub for an electric vehicle, the power-hub coupled with a battery of the electric vehicle, the power-hub comprising:
   a bi-directional converter comprising electrical circuitry coupled with a DC link bus and an AC port of the power-hub, the electrical circuitry comprising:
      at least four semiconductor switches;
      an EMI filter coupled in series with the AC port; and
      two inductors coupled in series with the EMI filter, wherein a first inductor is coupled with a first pair of the semiconductor switches and a second inductor is coupled with a second pair of the semiconductor switches; and
   control logic for controlling a current through the inductors and for controlling switching of the semiconductor switches,
   wherein the control logic is configured to perform Hysteretic Current Mode Control (HCMC) to control a current through the inductors based on a comparison of an inductor current sensed by a sense resistor with high and low voltage signals derived for a mode of the bi-directional converter, and
   wherein the bi-directional converter is configured to operate in a boundary condition mode (BCM) and a continuous conduction mode (CCM).

2. The power-hub in accordance with claim 1, wherein the bi-directional converter comprises a dual-active-bridge (DAB) converter for regulating current through the battery.

3. The power-hub in accordance with claim 1, wherein the control logic comprises a field-programmable gate array (FPGA), and wherein the FPGA comprises a first deadtime controller for controlling the first pair of the semiconductor switches and a second deadtime controller for controlling the second pair of the semiconductor switches.

4. The power-hub in accordance with claim 1, wherein the semiconductor switches comprise any one of: MOSFETs, insulated-gate bipolar transistors (IGBTs), and GaN high-electron mobility transistors (HEMTs).

5. The power-hub in accordance with claim 1, wherein the power-hub is configured to receive and transmit AC power through the AC port, and the control logic is configured to operate the electrical circuitry in the boundary condition mode (BCM) and a hybrid BCM-continuous conduction mode (CCM).

6. The power-hub in accordance with claim 5, wherein the power-hub provides electric power to a home in a vehicle-to-home (V2H) operating mode.

7. The power-hub in accordance with claim 5, further comprising a controller that is configured to apply a synchronization pulse to the electrical circuitry that synchronizes with a voltage frequency and phase of a grid.

8. The power-hub in accordance with claim 7, wherein the power-hub provides electric power to the grid in a vehicle-to-grid (V2G) operating mode.

9. The power-hub in accordance with claim 7, wherein the power-hub receives electric power from the grid in a grid-to-vehicle (G2V) operating mode.

10. The power-hub in accordance with claim 1, wherein the power-hub is configured to receive and transmit DC power through the AC port, and the control logic is configured to generate a constant current through the inductors in either the boundary condition mode (BCM) or the continuous conduction mode (CCM).

11. The power-hub in accordance with claim 10, wherein a DC voltage is received and transmitted at the peak voltage of an AC line cycle.

12. A system for charging a battery in an electric vehicle, the system comprising:
   a first electric vehicle comprising a charged electric battery and a first power-hub and
   a second electric vehicle comprising the depleted battery and a second power-hub;
   wherein a direct link is established between the first power-hub and the second power-hub; and
   wherein the control logic of the first power-hub is configured to operate in a vehicle-to-vehicle (V2V) operating mode and transmit DC power through the direct link to the second power-hub; and
   wherein the first power-hub and the second power-hub being in accordance with the power hub recited in claim 10.

13. The system of claim 12, wherein the control logic of the first power-hub is further configured to commutate the polarity of a DC voltage provided to the second power-hub in pre-defined commutation intervals.

14. The system of claim 13, wherein the polarity of the DC voltage provided to the second power-hub is commutated at a frequency of less than 50 Hz.

15. An electric vehicle, comprising:
   a battery; and
   a power-hub coupled with the battery;
   wherein the power-hub is configured to establish a direct link with a second power-hub of a second electric vehicle coupled with a battery of the second electric vehicle; and
   wherein the control logic of the power-hub is configured to operate in a vehicle-to-vehicle (V2V) operating mode to transmit/receive DC power through the direct link with the second power-hub; and
   the power-hub and the second power-hub being in accordance with the power hub recited in claim 10.

16. The power-hub in accordance with claim 1 comprising a digital controller configured to perform current scaling, mode selection and grid synchronization.

17. The power-hub of claim 1, wherein the bi-directional converter operates in BCM, and as an output load increases automatically switches to CCM when the sensed inductor current is equal to or exceeds a saturation current of the inductors.

18. A power-hub comprising:
an AC port connectable to either an AC micro-grid or a DC micro-grid;
four semiconductor switches;
an EMI filter coupled in series with the AC port;
two inductors coupled in series with the EMI filter, wherein a first inductor is coupled with a first pair of the semiconductor switches and a second inductor is coupled with a second pair of the semiconductor switches;
control logic configured to transmit DC power through the AC port and to control a current through the inductors, and wherein the control logic is configured to perform Hysteretic Current Mode Control (HCMC) when controlling the current through the inductors;
a first deadtime controller connected between the control logic and the first pair of semiconductor switches for controlling the first pair of the semiconductor switches; and
a second deadtime controller connected between the control logic and the second pair of semiconductor switches for controlling the second pair of the semiconductor switches.

19. The power-hub of claim 18 comprising a digital controller configured to perform current scaling, mode selection and grid synchronization.

20. The power of claim 18 wherein the control logic is configured to switch between a boundary condition mode (BCM) and a hybrid BCM-continuous conduction mode (CCM).

21. The power-hub of claim 19, further comprising an analog-to-digital converter and a zero crossing detector which are both connected between the AC port and the digital controller.

22. The power-hub of claim 18, comprising a current sense amplifier and two comparators to compare a sensed inductor current with $V_{high}$ and $V_{low}$ signals to generate gating signals to control the first and second deadtime controllers.

23. The power-hub of claim 18, wherein the semiconductor switches are MOSFETs.

24. The power-hub of claim 18, wherein an output voltage of the power-hub is regulated to a voltage equal to a peak of an AC line cycle at the AC port.

* * * * *